United States Patent [19]

Poehlsen

[11] Patent Number: 5,071,341
[45] Date of Patent: Dec. 10, 1991

[54] INJECTION MOLDING MACHINE WITH PRESSURE ASSIST NOZZLE

[75] Inventor: Rudolph H. Poehlsen, Adrian, Mich.

[73] Assignee: Hoover Universal, Inc., Plymouth, Mich.

[21] Appl. No.: 605,078

[22] Filed: Oct. 24, 1990

[51] Int. Cl.⁵ .............................................. B29C 45/02
[52] U.S. Cl. ............................. 425/557; 264/328.19;
  425/561; 425/562; 425/564
[58] Field of Search ............... 425/557, 560, 561, 562,
  425/563, 564, 565, 566, 572, 573; 264/328.9,
  328.19

[56] References Cited

U.S. PATENT DOCUMENTS

| Re. 28,721 | 2/1976 | Farrell | 425/564 |
| 2,862,241 | 12/1958 | De Mattia | 425/145 |
| 3,335,457 | 8/1967 | Martin, Jr. | 425/532 |
| 4,155,969 | 5/1979 | Hendry | 264/328.19 |
| 4,412,807 | 11/1983 | York | 425/564 |

Primary Examiner—Timothy Heitbrink
Attorney, Agent, or Firm—Harness, Dickey & Pierce

[57] ABSTRACT

An injection molding machine having an extruder, a nozzle, and an housing mounted between the extruder and nozzle. The housing encloses a pressure assist nozzle and a fluidic passage connecting the extruder and the extruder nozzle. A bore within the housing extends into the fluidic passage to define a portion of the passage between the extruder and the extruder nozzle. The bore has an aperture within a side wall which acts as a valve opening within the passage which, when closed, prevents flow between the extruder and the nozzle. An annular sleeve is reciprocated within the bore between a retract position, in which the annular sleeve is withdrawn from the passage, and an extend position, in which the annular sleeve is projected into the passage so as to close the aperture. A plunger piston reciprocally resides within the annular sleeve. The plunger piston is held in a retracted position by the annular sleeve while the annular sleeve is in its retracted position. When the annular sleeve has been actuated to close the aperture, the plunger piston becomes coupled with the annular sleeve and accompanies the annular sleeve as to continues toward the extend position such that the plunger piston acts to compress the melt within the molds.

16 Claims, 3 Drawing Sheets

INJECTION MOLDING MACHINE WITH PRESSURE ASSIST NOZZLE

BACKGROUND OF THE INVENTION

1. Field of the Invention

The present invention generally relates to injection molding machines for forming plastic products. More specifically, this invention relates to an injection molding machine having a pressure assist nozzle which operates to compress the molten plastic within the mold and shut off the flow of molten plastic to the injection mold.

2. Description of the Prior Art

Injection molding machines are widely used to produce plastic products having geometries with varying degrees of complexity. Injection molding machines are typically composed of an extruder, an injection manifold which is provided with molten plastic by the extruder and one or more injection molds which are fed the molten plastic, or melt, by the injection manifold. The extruder is typically provided with solid plastic shot or pellets through a gravity-fed hopper or the like. The plastic shot is plasticized within the extruder by way of heating elements within the extruder's walls. The extruder, through a plunging action or a rotating screw thread action or a combination of both, then operates to provide the injection manifold with a desired quantity of the melt. U. S. Pat. No. 3,335,457, typifies a common form of extruder which uses a reciprocating screw to deliver the melt to the manifold.

From the above it can be readily seen that it is desirable to achieve sufficient mold fill with the melt such that voids are prevented within the mold. Generally this requires an external pressure or displacement source which insures that the melt is sufficiently compresses with the mold throughout the fill and cooling processes. In addition, by providing pressure within the mold and manifold, voids created by shrinkage during cooling are also avoided.

In many typical injection molding processes, the extruder performs the function of compressing the melt within the mold. However, a disadvantage of this method is that the use of the extruder to insure sufficient fill of the mold prevents the extruder from preparing for the next plasticizing cycle. Therefore, it has been suggested in the art to provide an additional mechanism between the extruder and the mold to perform the compression step. An example of such a device is illustrated in U.S. Pat. No. Re. 28,721 to Farrell. Farrell teaches the use of separate shut off and pressurizing mechanisms which operate sequentially by way of a three way valve. The three way valve closes a passage between the extruder and the mold to stop the flow of melt, and then subsequently puts the mold in communication with an accumulator which pressurizes the melt within the mold. A disadvantage of the device taught by Farrell is the requirement for two separate mechanisms to accomplish the shut off and pressurization operations, resulting in more parts and a less compact injection molding machine.

In addition to the above, it is also important for economical reasons to supply to the molds the necessary quantity of melt to sufficiently fill the molds, and no more. When an excessive amount of melt is provided to the molds, flash is formed between the mold halves which must be removed for aesthetic and/or functional reasons. When an insufficient amount of melt is provided to the molds, voids form within the molds, again negatively affecting the final product aesthetically or functionally. The development of voids is aggravated because the melt shrinks as it cools within the mold.

For purposes of minimizing waste which occurs as mold flash between the mold halves, it is important in injection molding processes to shut off the flow of the melt to prevent excessive melt from being introduced into the mold. Consequently, a device for stopping the flow from the extruder to the mold is typically used to allow a predetermined quantity of melt to flow from the extruder. The quantity of melt is metered to avoid excessive melt from being injected into the mold and, accordingly, mold flash that accounts for waste is minimized.

Variations of this basic concept are embodied in U.S. Pat. No. 4,41,807 to York and U.S. Pat. No. 2,862,241 to DeMattia. York provides a shut off valve which is especially adapted to prevent weld lines from forming within the melt which remains within the injection molding machine between molding operations. DeMattia goes a step further by teaching the use of a spring loaded plunger which, upon the closing of a shut off valve, retracts to accommodate any excess melt, thereby reducing mold flash. Another example of a shut off valve used in the prior art is illustrated in U.S. Pat. No. 4,155,969 to Hendry which uses a shut off valve in the operation of a two step injection process.

From the above discussion it can be readily appreciated that the prior art does not disclose an injection molding machine which provides the advantages of both the shut off operation and the pressurizing operation all within one mechanism. In particular, the prior art does not provide a valve mechanism that acts to close the flow of the melt to the mold while also, by means of its operation, acts to maintain pressure within the mold to prevent voids from forming.

Accordingly, what is needed is an injection molding machine that is adapted to inject a predetermined quantity of melt into a mold, maintain pressure in the mold in a manner that prevents voids from forming within the melt, while also reducing extruder cycle time. In addition, what is needed is such a machine which provides both operations within one valve body to reduce the number of components required to perform the operation and to simplify manufacture and assembly of such an injection molding machine.

SUMMARY OF THE INVENTION

According to the present invention there is provided an injection apparatus for use in injection molding plastic products. The apparatus has an extruder device which operates to plasticize plastic shot received from a storage device, such as a hopper. The extruder then transfers the melt to a nozzle which feeds one or more molds. The extruder is in fluidic communication with the nozzle via a fluidic passage.

A bore extends into the passage to define a portion of the passage between the extruder and the nozzle. The bore has an aperture within a side wall which acts as a valve opening within the passage which, when closed, interrupts flow between the extruder and the nozzle. An annular sleeve is reciprocated within the bore by an actuating device. The annular sleeve is actuated between a retract position, in which the annular sleeve is withdrawn from the passage, and an extend position, in which the annular sleeve is projected into the passage in a direction toward the nozzle. When actuated from the retract position to an intermediate position between the retract and extend position, the annular sleeve closes the aperture in the bore, thereby blocking communication between the extruder and the nozzle.

A plunger piston reciprocally resides within the annular sleeve. The plunger piston is held in a retracted position by the annular sleeve while the annular sleeve is in its retract position. When the annular sleeve has been actuated to close the aperture and thereby stop the flow of melt between the extruder and the nozzle, the plunger piston becomes coupled with the annular sleeve and accompanies the annular sleeve as it continues toward the extend position. By so doing, the plunger piston acts to reduce the internal volume of the passage between the aperture and the nozzle, thereby compressing the melt within the molds.

According to a preferred aspect of this invention, the annular sleeve operates to close the aperture once the extruder displaces a predetermined volume of melt, thereby preventing further displacement of melt from the extruder. As a result, the volume of melt necessary to fill the mold or molds can be delivered accurately. Once the necessary volume of melt is delivered, the annular sleeve closes the aperture to stop the flow of melt, avoiding the waste associated with excess melt being delivered to the mold.

In addition, a significant advantage of the present invention is that following the closure of the aperture, the plunger piston acts to compress and pressurize the melt within the nozzle and the mold to prevent the formation of voids within the mold.

Accordingly, it is an object of the present invention to provide an injection molding machine which is capable of accurately delivering a predetermined quantity of melt to a mold through the use of an annular sleeve operating as a shut off valve.

It is a further object of this invention that such an injection molding machine be capable of preventing voids from forming in the melt injected into the mold through use of a plunger piston operating as a pressurizing device.

It is still a further object of this invention that such an injection molding machine combine the functions of the shut off valve and the pressuring device within a pressure assist nozzle to simplify the operational aspects of the injection molding machine.

It is yet another object of this invention that such a pressure assist nozzle provide for a more compact apparatus with fewer parts.

Other objects and advantages of this invention will be more apparent after a reading of the following detailed description taken in conjunction with the drawings provided.

DETAILED DESCRIPTION OF THE PREFERRED EMBODIMENT

Figure 1:
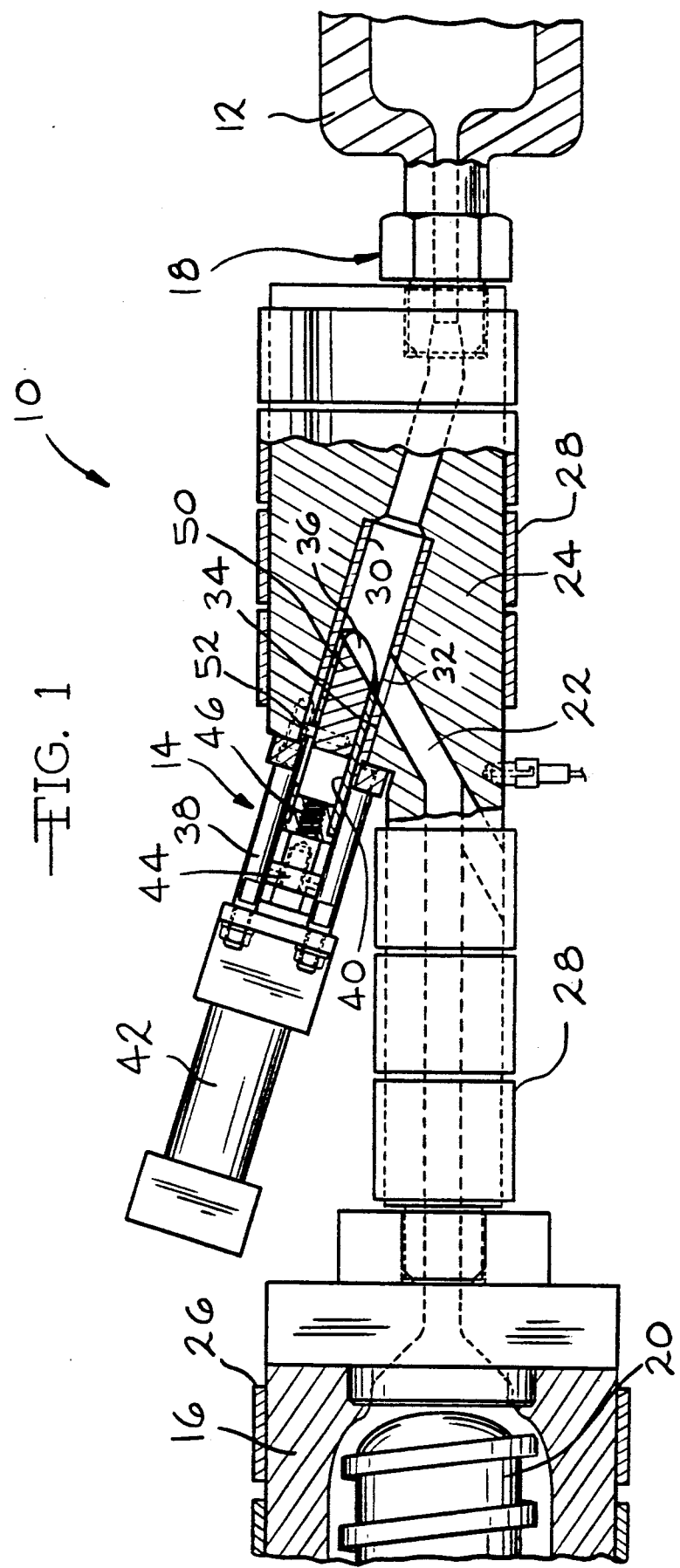
FIG. 1 is a foreshortened fragmentary partial cross-sectional view of an injection molding machine with pressure assist nozzle in accordance with a preferred embodiment of this invention.

In a preferred embodiment of this invention, an injection molding machine 10, shown in FIG. 1, is provided which injects molten plastic, or melt, into a mold 12 for forming plastic products. The machine 10 provides a sequential two step shut off and compression action through the use of a pressure assist nozzle 14 incorporating a unique combination shut off sleeve and plunger.

The injection molding machine 10 includes an extruder 16 which receives plastic shot from any convenient storage device, such as a hopper (not shown). The extruder 16 operates to plasticize the shot into melt and deliver the melt to an extruder nozzle 18 which is suitable for further delivering the melt to one or more molds 12. The extruder 16 can be of any suitable form, such as the screw thread 20 illustrated in FIG. 1. To plasticize the shot and maintain the melt in a fluid form during its progress through the injection molding machine 10, the extruder is provided with heating elements 26, generally shown as heating bands in FIG. 1.

The extruder nozzle 18 is in fluidic communication with the extruder 16 via a fluidic passage 22. The fluidic passage 22 resides within a housing 24 which is mounted between the extruder 16 and the extruder nozzle 18. The housing 24 contains the pressure assist nozzle 14 which constitutes the preferred embodiment of the present invention. Similar to the extruder 16, the housing 24 is provided with heating elements 28 to maintain the melt in a fluid state.

A fitted sleeve 48 defines a valve bore 30 as a portion of the fluidic passage 22 within the housing 24. Within corresponding side walls of the fitted sleeve 48 and the valve bore 30 there is an aperture 32 which provides fluidic communication between the extruder 16 and the extruder nozzle 18. The valve bore 30, as defined by the fitted sleeve 48, extends outside the flow path of the fluidic passage 22 to the exterior of the housing 24 to form a plunger bore 34. Accordingly, as seen in FIG. 1, the plunger bore 34 constitutes that portion of the valve bore 30 between the aperture 32 and the exterior surface of the housing 24. The fluidic passage 22 and the portion of the valve bore 30 which resides within the flow path of the fluidic passage define a finite internal volume between the extruder 16 and the extruder nozzle 18.

Figure 2:
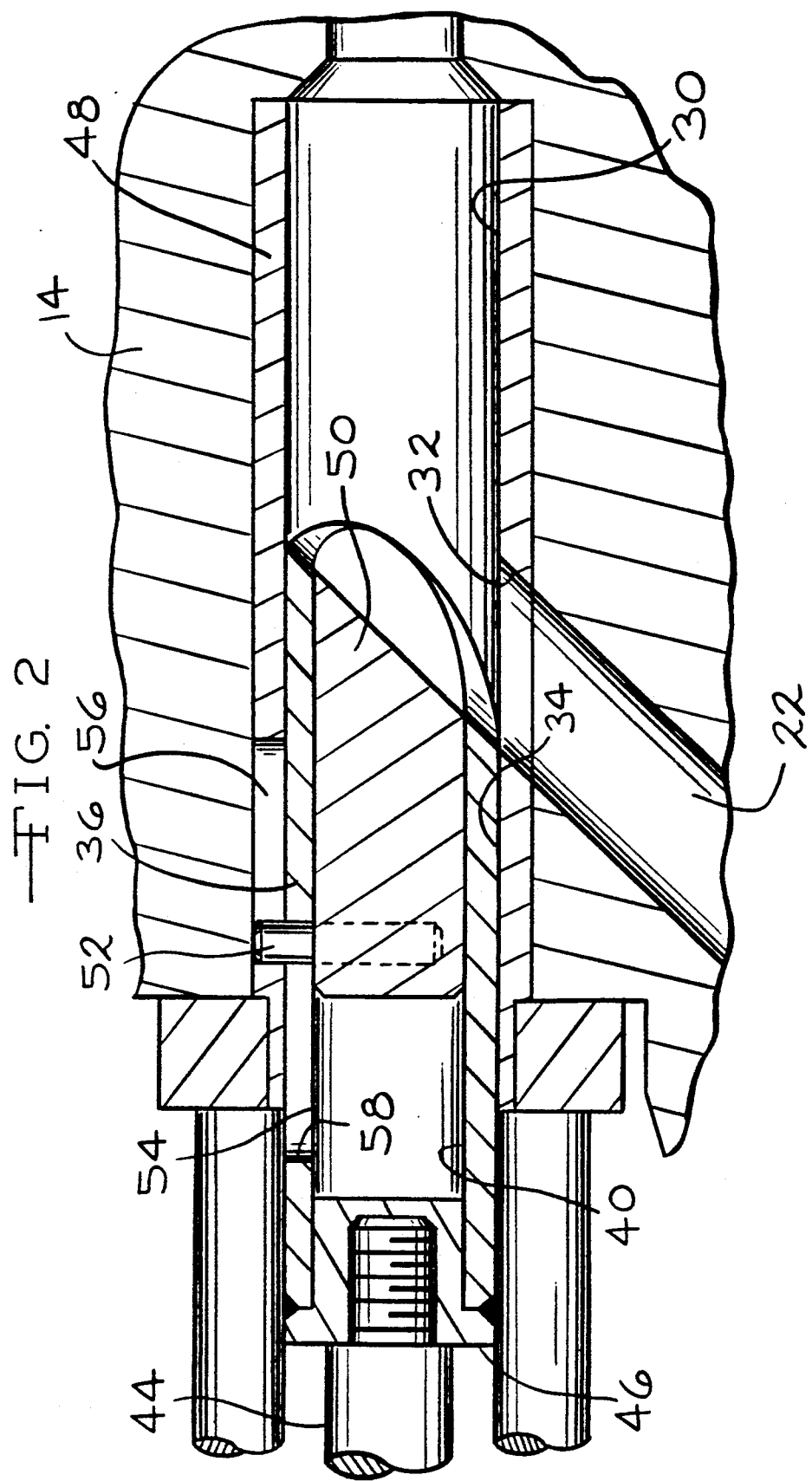
FIG. 2 is a detailed cross-sectional illustration of the pressure assist nozzle of FIG. 1 in a retracted flow position.
Figure 4:
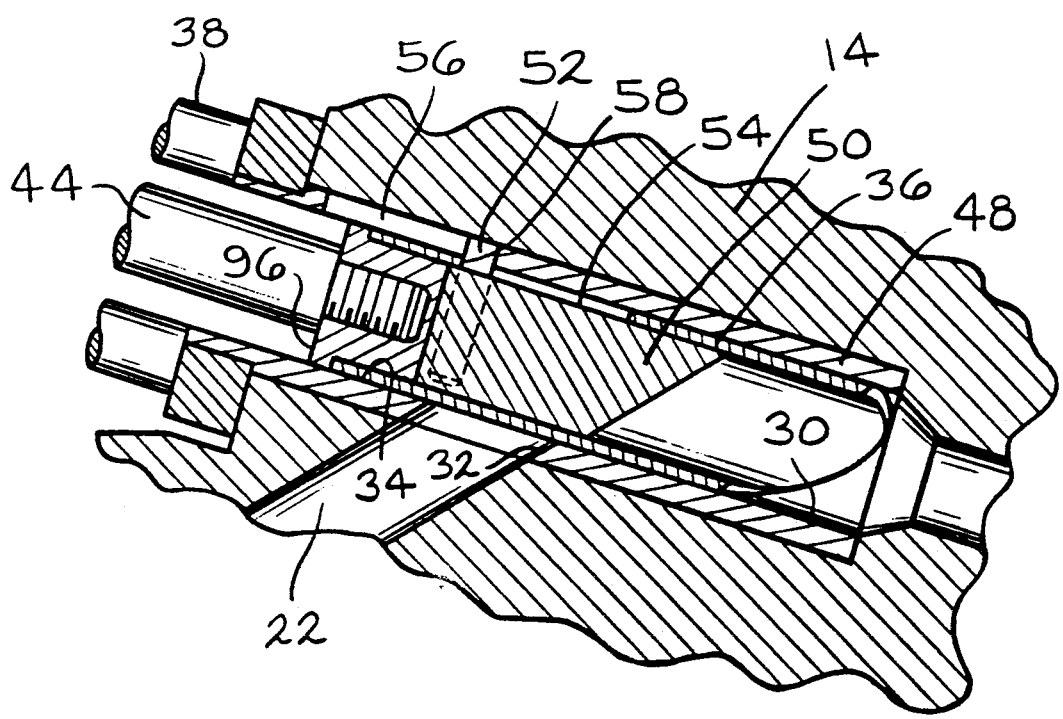
FIG. 4 is a detailed cross-sectional illustration of the pressure assist nozzle of FIG. 1 in an extended pressurizing position.

Attached to the housing 24 is an actuator support 38 located coaxial with the plunger bore 34 and the valve bore 30. A plunger 44 is reciprocated by way of a hydraulic actuating cylinder 42 mounted to the actuator support 38. The plunger 44 reciprocates between an extend position and a retract position. FIGS. 1 and 2 illustrate the retracted position of the plunger 44, whereas FIG. 4 illustrates the extend position of the plunger 44. The plunger 44 is threaded into the face 96 of a sleeve end 46 extending toward the plunger bore 34 and the valve bore 30. When the hydraulic actuating cylinder 42 strokes the plunger 44 to its extend positioned, as shown in FIG. 4, the sleeve end 46 extends into the plunger bore 34.

Figure 3:
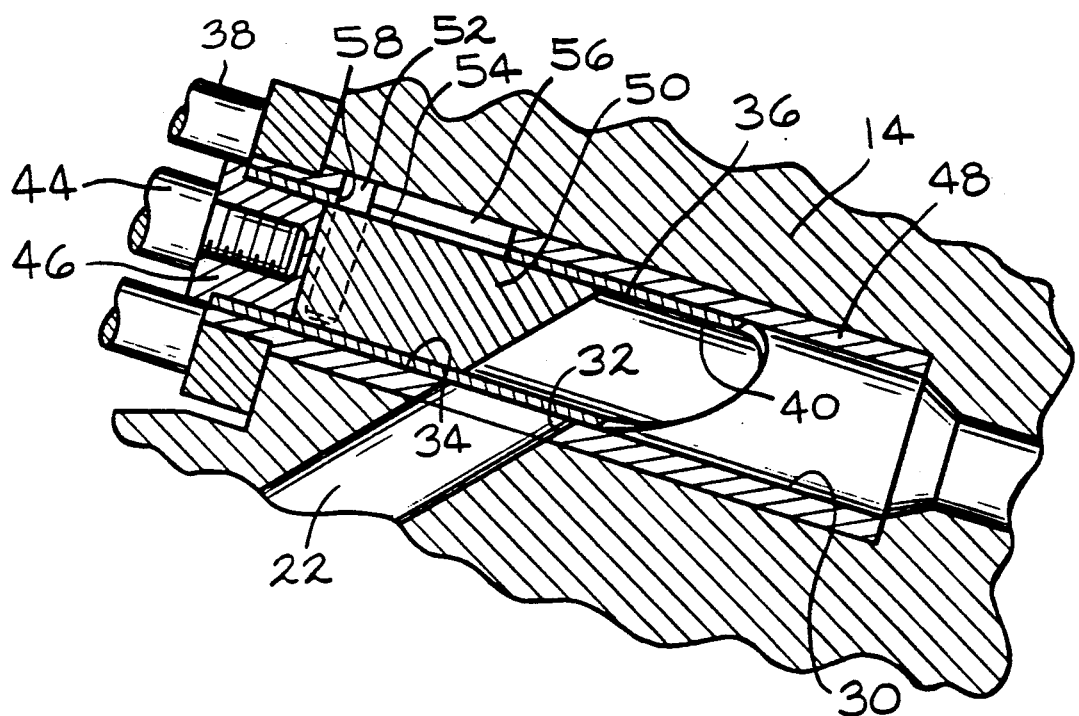
FIG. 3 is a detailed cross-sectional illustration of the pressure assist nozzle of FIG. 1 in an intermediate shut off position in accordance.

An annular sleeve 36 is attached to the sleeve end 46 so that it is reciprocable between the plunger bore 34 and the valve bore 30 when the plunger 44 is stroked between the retracted and extended positions. The length of the annular sleeve 36 is such that, when in the retract position, the annular sleeve 36 does not extend beyond the aperture 32, as seen in FIGS. 1 and 2. However, the length of the annular sleeve 36 must be sufficient such that, when in an intermediate position between the retracted and extended positions, the annular sleeve 36 closes the aperture 32, as seen in FIG. 3.

A plunger piston 50 reciprocally resides within an annular sleeve bore 40 of the annular sleeve 36. The travel of the plunger piston 50 is determined by a radially fixed pin 52 which traverses a pair of corresponding slots 54 and 56 in the annular sleeve 36 and fitted sleeve 48, respectively. The slot 56 within the fitted sleeve 48 acts to keep the plunger piston 50 within the valve bore 30 of the housing 24 at all times. The slot 54 is positioned longitudinally within the annular sleeve 36 such that the end of the slot 54 acts as an abutment 58, urging the plunger piston 50 into the flow path of the fluidic passage 22 when the annular sleeve 36 is between its intermediate position, as shown in FIG. 3, and its extended position, as shown in FIG. 4. As the plunger piston 50 enters the flow path of the fluidic passage 22, the plunger piston 50 displaces a corresponding portion of the internal volume of the fluidic passage 22. In effect, the plunger piston 50 acts to reduce the original internal volume of the fluidic passage 22, compressing the melt between the aperture 32 and the molds 12.

In operation, at the start of a cycle the extruder 16 is provided with a quantity of plastic shot (not shown). The extruder 16 plasticizes the plastic shot to form melt (not shown). The extruder 16 simultaneously rotates and plunges to transport the melt to the fluidic passage 22. At this time, the plunger 44 is in its retracted position within the plunger bore 34, as best seen in FIG. 2. Consequently, the annular sleeve 36 resides partially in that portion of the valve bore designated as the plunger bore 34. The plunger piston 50 resides entirely within the annular sleeve bore 40 of the annular sleeve 36, which in turn resides within the plunger bore 34.

After a predetermined period of time in which, determined through prior calibration, a desired quantity of melt has been transported from the extruder 16 through the fluidic passage 22 and extruder nozzle 18 to the molds 12. At such a time a signal is provided to the hydraulic actuating cylinder 42 to stroke the plunger 44 from its retracted position towards the valve bore 30 and the extended position. Consequently, the annular sleeve 36 also is stroked, eventually arriving at its intermediate position in which the annular sleeve 36 closes the aperture 32 to stop the flow of melt, as shown in FIG. 3. At this time the plunger piston 50 remains within the annular sleeve bore 40 in the area of plunger bore 34 because the pin 52 has yet to encounter the abutment 58 within the slot 54 of the annular sleeve 36.

As the hydraulic actuating cylinder 42 continues to stroke the plunger 44 towards the extended position, the pin 52 abuts the abutment 58 of the annular sleeve 36, thereby urging the plunger piston 50 into the flow path of the fluidic passage 22. The plunger 44 continues to be stroked until the plunger piston 50 meets sufficient resistance from the melt trapped between the now closed aperture 32 and the molds 12. The plunger 44, annular sleeve 36 and plunger piston 50 ultimately reach the extend position, illustrated in FIG. 4. The entire pressure assist nozzle 14 is then returned to the retract position, illustrated in FIGS. 1 and 2, by a reverse order of the above described operation.

A significant advantage of the injection molding machine 10 described above is that the pressure assist nozzle 14, comprised of the annular sleeve 36 and the plunger piston 50, performs a two step shut off and compression action. The annular sleeve 36 provides the shut off action to interrupt flow between the extruder 16 and the molds 12 when it closes the aperture 32, while the plunger piston 50 provides the compression action upon the melt when it is stroked into the flow path of the fluidic passage 22 so as to reduce the internal volume of the fluidic passage 22. The design of the pressure assist nozzle 14 also provides a more compact apparatus with fewer parts than similar injection molding machines heretofore known in the prior art which provides similar shut off and compression operations.

In addition, a significant advantage of the present invention is that the plunger piston 50 acts to compress and pressurize the melt within the injection manifold 18 and the molds 12 when the plunger piston 50 is traversed from the intermediate position to the extended position. The pin 52 of the plunger piston 50 is positioned with respect to the abutment 58 of the annular sleeve 36 so that the plunger piston 50 begins to compress the melt immediately following the closing of the aperture 32 by the annular sleeve 36.

While the invention has been described in terms of a preferred embodiment, it is apparent that other forms could be adopted by one skilled in the art. Accordingly, the scope of the invention is to be limited only by the following claims.

What is claimed is:

1. An injection apparatus comprising:
   extruder means for supplying molten plastic;
   nozzle means for directing said molten plastic, said nozzle means being in fluidic communication with said extruder means via a fluidic passage, said fluidic passage having a bore wherein, said bore defining an aperture within said fluidic passage;
   an annular sleeve reciprocally residing within said bore, said annular sleeve being reciprocated between an extended position and a retracted position by actuating means, said annular sleeve closing said aperture when said annular sleeve is in an intermediate position between said retracted position and said extended position; and
   a plunger piston reciprocally residing within said annular sleeve, said plunger piston having engagement means in communication with said annular sleeve, said engagement means acting to couple said plunger piston with said annular sleeve as said annular sleeve traverses from said intermediate position to said extended position, said plunger piston thereby acting to reduce said internal volume of said fluidic passage.

2. An injection apparatus as claimed in claim 1, wherein said bore defines a passage portion and a plunger portion, said annular sleeve reciprocating within both said passage portion and said plunger portion, said aperture being located in a wall of said passage portion.

3. An injection apparatus as claimed in claim wherein said annular sleeve has an abutment means in communication with said engagement means, said abutment means engaging said engagement means when said annular sleeve is at said intermediate position.

4. An injection apparatus as claimed in claim 1, wherein said extruder means is operable to displace a fluidic injection material from said extruder means through said fluidic passage to said nozzle means.

5. An injection apparatus as claimed in claim 4, wherein said actuating means traverses said annular sleeve from said retract position to said intermediate position after said extruder means displaces a predetermined quantity of said fluidic injection material, said annular sleeve thereby closing said aperture to prevent further displacement of said fluidic injection material from said extruder means.

6. An injection apparatus as claimed in claim 5, wherein said plunger piston acts to compress and pressurize said fluidic injection material within said nozzle means while said plunger piston is being traversed with said annular sleeve from said intermediate position to said extend position.

7. An injection molding apparatus providing a two step shut off and compression action upon a molten plastic, said injection mold apparatus comprising:
   an extruder;
   an extruder nozzle in fluidic communication with said extruder via a fluidic passage, said fluidic passage defining an internal volume between said extruder and said extruder nozzle;
   a bore defining a portion of said fluidic passage, said bore having an aperture in a side wall thereof, said aperture providing fluidic communication between said extruder and said extruder nozzle therethrough, said bore extending beyond said fluidic passage to form a plunger bore;
   a plunger reciprocally residing within said plunger bore, said plunger being reciprocated by actuating means between an extended position and a retracted position, said plunger having a plunger end extending toward said bore when said plunger is in said extended position;
   an annular sleeve attached to said plunger end, said annular sleeve being reciprocable within said plunger bore and said bore by said plunger, said annular sleeve closing said aperture of said bore when said plunger is in an intermediate position between said retracted position and said extended position, said annular sleeve having abutment means; and
   a plunger piston reciprocally residing within said annular sleeve, said plunger piston having engagement means in communication with said abutment means of said annular sleeve, said engagement means engaging said abutment means thereby urging said plunger piston into said bore while said plunger traverses from said intermediate position to said extended position, said plunger piston thereby acting to reduce said internal volume of said fluidic passage.

8. An injection molding apparatus as claimed in claim 7, wherein said annular sleeve performs a shut off action and said plunger piston performs a compression action to constitute said two step shut off and compression action.

9. An injection molding apparatus as claimed in claim 7, wherein said actuating means is a hydraulic actuating cylinder.

10. An injection molding apparatus as claimed in claim 7, further comprising a mounted housing mounted between said extruder and said injection manifold, said fluidic passage and said bore being formed within said housing.

11. An injection molding apparatus as claimed in claim 10, further comprising heating elements for heating said housing.

12. An injection molding apparatus as claimed in claim 10, further comprising an actuating housing, said actuating housing being mounted to said mounted housing, said plunger bore being formed in part within said actuator housing.

13. An injection molding apparatus as claimed in claim 7, wherein said extruder is operable to displace said molten plastic from said extruder through said fluidic passage to said extruder nozzle.

14. An injection molding apparatus as claimed in claim 13, wherein said actuating means traverses said plunger from said retract position to said intermediate position after said extruder displaces a predetermined volume of molten plastic, said annular sleeve thereby closing said aperture to prevent further displacement of said molten plastic from said extruder.

15. An injection molding apparatus as claimed in claim 13, wherein said plunger piston acts to compress and pressurize said molten plastic within said extruder nozzle while said plunger piston is being traversed with said annular sleeve from said intermediate position to said extend position.

16. An injection molding apparatus as claimed in claim 7, wherein said engagement means is a pin extending radially from said plunger piston and said abutment means is formed on a longitudinal slot within said annular sleeve, said pin traversing said slot between said retract and said intermediate positions, said pin abutting said abutment means between said intermediate and said extend positions.

* * * * *

UNITED STATES PATENT AND TRADEMARK OFFICE
CERTIFICATE OF CORRECTION

PATENT NO. : 5,071,341

DATED : December 10, 1991

INVENTOR(S) : Rudolph H. Poehlsen

It is certified that error appears in the above-identified patent and that said Letters Patent is hereby corrected as shown below:

Column 6, Claim 1, line 32, kindly delete "wherein" and insert --therein--.

Column 6, Claim 3, line 56, after "claim", kindly insert --1,--.

Signed and Sealed this

Twentieth Day of July, 1993

Attest:

*Attesting Officer*

MICHAEL K. KIRK

*Acting Commissioner of Patents and Trademarks*